Nov. 26, 1929.  T. C. DELAVAL-CROW  1,736,966

BEARING MOUNTING

Filed March 3, 1926

INVENTOR:
T. C. DELAVAL-CROW,
BY Giles P. Moore
HIS ATTORNEY.

Patented Nov. 26, 1929

1,736,966

UNITED STATES PATENT OFFICE

THOMAS C. DELAVAL-CROW, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING MOUNTING

Application filed March 3, 1926. Serial No. 91,955.

This invention relates to bearing mountings and comprises all the features of novelty herein described, by way of example, as embodied in an antifriction bearing mounting and lubricating means for a silk spinning spindle.

An object of the invention is to provide an improved mounting for a silk spindle or the like to maintain an unvarying axis of rotation and reduce friction and wear. Another object is to provide improved apparatus for insuring a constant circulation of lubricant through the bearings of a high speed rotary member.

To these ends and to improve generally upon devices of this general character, the invention also consists in the various matters hereinafter described and claimed.

In the drawings, Figure 1 is a longitudinal central section of a vertical spindle and mounting.

Figure 1:
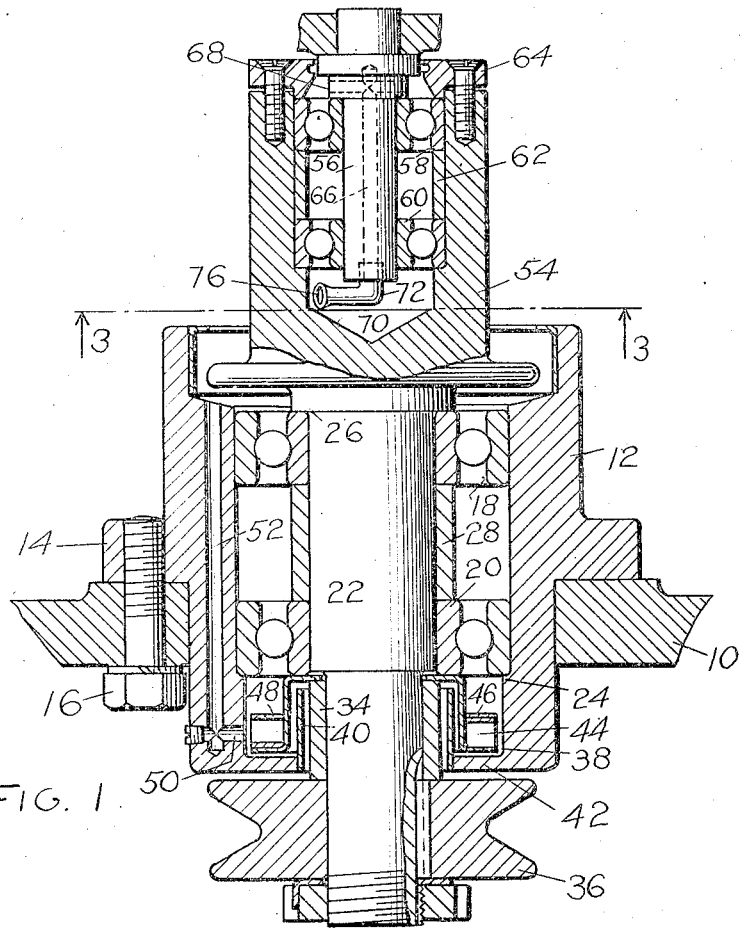
Figure 2:
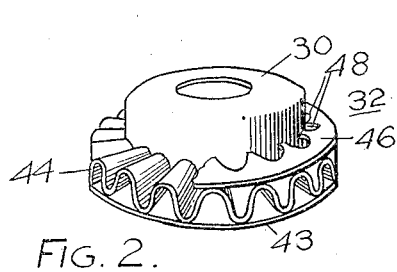
Figure 2 is a perspective view of a detail.
Figure 3:
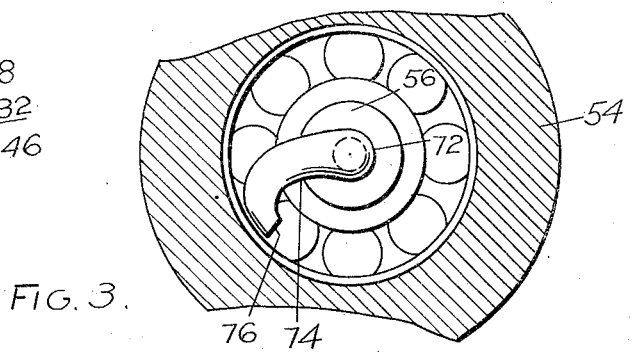
Figure 3 is a section on line 3—3 of Figure 1, enlarged.

The numeral 10 indicates generally the rail of a silk spinning machine, the rail having an opening to receive a supporting bolster or housing 12 with a flange 14 resting on the rail and secured to it by screw bolts 16. In the housing are upper and lower antifriction bearings, herein shown as ball bearings 18 and 20 which support a vertical spindle or shaft 22 for rotation. The outer race ring of the lower bearing 20 rests against a shoulder 24 in the housing and the outer race ring of the upper bearing 18 can float in the housing. The inner race ring of the upper bearing 18 abuts against a shoulder 26 on the spindle and is spaced from the inner race ring of the lower bearing 20 by a sleeve 28. The inner race ring of the lower bearing 20 abuts against a horizontal flange 30 on a fan or pump 32, the flange being held by a spacing sleeve 34 and by a pulley 36 keyed to the spindle and clamped to it by a nut.

The fan or pump 32 is in the form of a flanged cup or ring which rotates within a lubricant holding recess 38 of the housing, the recess being closed at its inner periphery by a sleeve 40 pressed in a circular hole in a flange 42 of the housing. The fan or pump has a cylindrical body wall which surrounds the sleeve 40 and terminates in a horizontal flange 43. A ring 44 of sinuous form is supported by the flange 43 and forms a series of vanes or waves. A thin ring 46 rests on the high points of the vanes and has a series of openings 48 at its inner periphery to allow lubricant to drop from the bearings into the valleys between the vanes. The sinuous ring may be soldered or otherwise attached to the flange 43 and ring 46. Rotation of the fan or pump throws the lubricant by centrifugal force into one or more ports 50, each communicating with a vertical passage 52 extending longitudinally through the body of the housing. Thus the lubricant is lifted to a point above the upper bearing 18 and from this point the lubricant can gravitate to the bearings and go back to the fan or pump.

A rotating member, herein shown as a whirl indicated generally at 54, rotates with the spindle and to insure rotation on an unvarying axis, it is internally provided with antifriction bearings supported on a stub shaft 56 fixed to any suitable part of the machine frame in axial alignment with the spindle. The bearings herein shown are upper and lower ball bearings 58 and 60, one inner race ring abutting a shoulder on the stub shaft and the other being free to float. The lower outer race ring abuts a shoulder in a recess of the whirl and is spaced from the other outer race ring by a sleeve 62. A cap 64 fastened by screws to the top of the whirl holds the outer races in place. The stub shaft has a longitudinal central bore 66 with ports 68 leading radially outwards above the upper bearing 58. Fixed to the lower end of the stub shaft in a lubricant collecting recess 70 is a pipe or tube 72 extending outwardly and curving transversely of the shaft, as at 74, in a direction opposite to the direction of rotation of the whirl. The mouth of the pipe is widened laterally as at 76 and carried close to the periphery of the lubricant collecting recess so that lubricant, thrown outwardly by centrifugal force of rotation, enters the pipe smoothly and ascends the bore 66 to the ports 68 from which points it drops by gravity to the bearings and goes back to the recess.

Although the invention has been disclosed by reference to a specific construction, it is not necessarily limited, in its broader aspects, to the embodiment selected for mere illustrative purposes.

I claim:

1. In a bearing mounting, an upright shaft having a central bore open at the lower end, a rotary member having a lubricant collecting chamber therein and enclosing the lower end of the shaft, antifriction bearings between the shaft and the rotary member, said shaft having lubricant passages leading from its bore to points above the bearings, a pipe secured to the end of the shaft and communicating with the bore in the shaft, said pipe extending axially downwards from the end of the shaft and curving transversely of the shaft to receive lubricant thrown outwardly in the chamber by the rotation of the member the lubricant being forced to the passages above the bearings and returning by gravity through the bearings to the chamber; substantially as described.

2. In a bearing mounting, a rotary member having a spindle supporting housing surrounding and enclosing the spindle, an antifriction bearing between the spindle and the supporting housing, a supporting shaft extending into a recess of the rotary member, an antifriction bearing between the shaft and the rotary member, and means for driving the spindle; substantially as described.

3. In a bearing mounting, a recessed rotary member having a spindle, a housing surrounding the spindle, an antifriction bearing between the spindle and the housing, a supporting shaft extending into the recess of the rotary member, an antifriction bearing between the shaft and the rotary member, and centrifugally operating mechanism in the housing and in the recess of the rotary member for causing lubricant to circulate through the bearings; substantially as described.

4. In a bearing mounting, a rotary spindle, a housing surrounding the spindle and having a lubricant receptacle at one end, an antifriction bearing between the spindle and the housing, a fan secured to the spindle and comprising a sinuous ring rotatable in the receptacle, and passages extending from the periphery of the ring through the body of the housing to the bearing to conduct lubricant from the fan to the bearing; substantially as described.

5. In a bearing mounting, a rotary spindle, a housing surrounding the spindle and having a lubricant receptacle at one end, antifriction bearings between the shaft and the housing, a fan secured to the spindle and comprising a flanged cup having a sinuous ring, a ring supported on said sinuous ring and having openings, and passages extending through the body of the housing to conduct lubricant from the fan to the bearings; substantially as described.

6. In a bearing mounting, a rotary spindle, a housing surrounding the spindle and having a flange at one end, a sleeve fitting in said flange for confining lubricant in the housing, antifriction bearings between the spindle and the housing, a fan comprising a flanged cup secured to the spindle and having its body wall enclosing the sleeve, a sinuous ring surrounding said body wall and rotatable in the receptacle, the housing having ports opposite the periphery of the sinuous ring with passages connecting the ports with the opposite end of the housing to conduct lubricant from the fan to the bearings; substantially as described.

In testimony whereof I hereunto affix my signature.

THOMAS C. DELAVAL-CROW.

CERTIFICATE OF CORRECTION.

Patent No. 1,736,966.                              Granted November 26, 1929, to

THOMAS C. DELAVAL-CROW.

It is hereby certified that error appears in the printed specification of the above numbered patent requiring correction as follows: Page 2, line 23, claim 1, insert a comma after the syllable "ber"; same page, line 28, claim 2, after the word "spindle" insert a comma and the article ", a"; and that the said Letters Patent should be read with these corrections therein that the same may conform to the record of the case in the Patent Office.

Signed and sealed this 14th day of January, A. D. 1930.

(Seal)                                                     M. J. Moore,
                                                             Acting Commissioner of Patents.